(12) United States Patent
Vondran, Jr.

(10) Patent No.: US 6,243,791 B1
(45) Date of Patent: Jun. 5, 2001

(54) METHOD AND ARCHITECTURE FOR DATA COHERENCY IN SET-ASSOCIATIVE CACHES INCLUDING HETEROGENEOUS CACHE SETS HAVING DIFFERENT CHARACTERISTICS

(75) Inventor: Gary Lee Vondran, Jr., Winchester, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/133,632

(22) Filed: Aug. 13, 1998

(51) Int. Cl.$^7$ ...................................................... G06F 13/00
(52) U.S. Cl. ........................................... 711/120; 711/123
(58) Field of Search .................................... 711/119, 120, 711/123

(56) References Cited

U.S. PATENT DOCUMENTS

| | | | |
|---|---|---|---|
| 5,638,537 | * 6/1997 | Yamada et al. | 711/123 X |
| 5,745,727 | * 4/1998 | Chau et al. | 711/119 X |
| 5,848,432 | * 12/1998 | Hotta et al. | 711/119 X |
| 6,000,013 | * 12/1999 | Lau et al. | 711/119 |

OTHER PUBLICATIONS

Chi–Hung Chi and Henry Dietz "Improving Cache Performance by Selective Cache Bypass", 1989, IEEE, pp. 277–285.

Gordon Kurpanek, Ken Chan, Jason Zheng, Eric DeLano, William Bryg "PA7200: A PA–RISC Processor with Integrated High Performance MP Bus Interference", 1994, IEEE, pp. 375–382.

Kevin Theobald, Herbert H.J. Hum, Guang R. Gao "A Design Framework for Hybrid–Access Caches", 1995, IEEE, pp. 144–153.

O. Temam and N. Drach "Software Assistance for Data Caches", 1995, IEEE, pp. 154–163.

* cited by examiner

*Primary Examiner*—David L. Robertson

(57) ABSTRACT

A processor architecture and method are shown which involve a cache having heterogeneous cache sets. An address value of a data access request from a CPU is compared to all cache sets within the cache regardless of the type of data and the type of data access indicated by the CPU to create a unitary interface to the memory hierarchy of the architecture. Data is returned to the CPU from the cache set having the shortest line length of the cache sets containing the data corresponding to the address value of the data request. Modified data replaced in a cache set having a line length that is shorter than other cache sets is checked for matching data resident in the cache sets having longer lines and the matching data is replaced with the modified data. All the cache sets at the cache level of the memory hierarchy are accessed in parallel resulting in data being retrieved from the fastest memory source available, thereby improving memory performance. The unitary interface to a memory hierarchy having multiple cache sets maintains data coherency, simplifies code design and increases resilience to coding errors.

25 Claims, 14 Drawing Sheets

METHOD AND ARCHITECTURE FOR DATA COHERENCY IN SET-ASSOCIATIVE CACHES INCLUDING HETEROGENEOUS CACHE SETS HAVING DIFFERENT CHARACTERISTICS

BACKGROUND OF THE INVENTION

1. Field of the Invention

This invention relates generally to caches in computer architectures and more specifically to multiple cache sets with specialized functionality.

2. Description of the Related Art

Microprocessor systems include various types of memory which store the instructions and data by which the microprocessor operates. The memory is organized along the lines of a general hierarchy which is illustrated in FIG. 1. The hierarchy is organized in order of increasing memory access time with the memory level having the fastest access time being positioned relatively closer to the central processing unit (CPU) of the microprocessor system. Registers are the fastest memory devices and are generally internal architecture units within the microprocessor. Toward the middle level is main memory which is typically constructed using semiconductor memory devices, such as random access memory (RAM) chips, which are directly accessed by the microprocessor through an external bus. Mass storage represents relatively large amounts of memory that are not directly accessed by the microprocessor, such as magnetic disks or CDROM, and which is typically much slower to access than main memory. Archival storage represents long-term memory which typically requires human intervention for access, such as the loading of a magnetic tape.

In addition, microprocessor systems typically include cache memory at a level in between the registers and main memory which contains copies of frequently used locations in main memory. For each entry in a cache memory, there is a location to store the data and a tag location that identifies the corresponding location in main memory with which the data is associated. When the microprocessor outputs an address value on the memory bus at the beginning of a data access cycle, the address value is compared to the tags in cache memory to determine whether a match exists. A match of an address value to a cache tag is called a cache hit and the data is accessed in cache rather than main memory.

Cache memory is relatively small and fast as compared to main memory, but is also more expensive on a per bit basis. When a microprocessor can operate at higher speeds than main memory, then processor cycles can be saved and performance improved by including cache in the memory hierarchy of the microprocessor subsystem. To improve performance and reduce cost, the local memory in a microprocessor typically includes one or more cache devices.

FIG. 2A illustrates an example of a conventional microprocessor 10 whose local memory includes a cache 50 and main memory 80. In the course of operation of microprocessor 10, small portions of data from main memory 80 are moved into cache 50 for fast access by CPU 20 via CPU data bus 22. Subsequent accesses by CPU 20 to the same data are made to the cache 50 rather than main memory 80. A cache controller 30 monitors the data accesses made by CPU 20 and determines whether the desired data is resident in cache 50, main memory 80 such as CD-ROMs or mass storage disks or in other storage devices. The cache controller 30 also moves data between cache 50 and main memory 80 such as based upon the data accesses requested by CPU 20 and the cache replacement policy designed into the cache controller. There is overhead time associated with the data management activities of cache controller 30, but, ideally, the cache overhead is outweighed by the advantage gained from the lower access time of the cache devices.

Typically, cache controller 30 is connected to main memory 80 via a main memory data bus 82 and a separate cache data bus 32 which connects it to cache 50. In response to a data access from CPU 20, the cache controller 30 will generally attempt to find the data in cache 50. If the data is not found in cache 50, i.e. a cache miss occurs in cache 50 and is communicated back to cache controller 30, then cache controller 30 will attempt to find the data in main memory 80. CPU 20 can also be configured to perform a cache bypass memory access wherein the CPU sends a bypass control directive to cache controller 30 which causes the data access to go directly to main memory 80 to find the data thereby bypassing cache 50.

Microprocessors are sometimes designed with multiple sub-layers of cache, as is also illustrated in FIG. 2A. Cache 50 is divided into a first level cache 52 and a second level cache 56. The first level cache 52 will typically be a smaller, faster and more expensive per bit device than the larger second level cache 56. The first level cache will also typically maintain data at a finer level of granularity than second level cache 56. Cache devices are typically arranged in terms of lines, where the line is one or more data words and is the unit of data brought in on a miss. Thus, the first level cache may have a line length of just one or two words, while the second level cache will have a line length on the order of eight or sixteen words. In the multiple level cache structure, cache controller 30 controls the population and replacement of data between the two levels of cache and main memory.

Caches are typically designed to exploit temporal and spatial locality in the program under execution by the microprocessor 10. Temporal locality is the tendency of programs to access a piece of data multiple times within a relatively short interval of time. By moving the piece of data from main memory 80 to cache 50, the microprocessor can take advantage of temporal locality to reduce the time required to access the piece of data for later accesses. Spatial locality is the tendency of programs to make subsequent accesses to data which is located nearby the data which has recently been accessed, i.e. an access to one portion of a block or line of data will likely be followed by accesses to other portions of the same block or line of data.

However, different types of data can exhibit highly divergent access characteristics. For instance, some types of data, such as image or audio data, get processed by walking through the data once without repetitive access. This highly spatial data also tends to be in the form of blocks or pages of relatively large size. As the spatial data is sequentially accessed by CPU 10, cache controller 30 will stream the spatial data into cache 50 thereby replacing the data already present in the cache. Streaming in a block of this spatial data tends to occupy the entire cache space with data which will not be subsequently accessed or will not be accessed for a significant period of time. Other data which would have been beneficial to keep in cache is thus flushed out and the efficiency and efficacy of the cache function is undermined.

As a simple example, consider the case where the size of cache 50 is 32 Kbytes and the block size of some highly spatial data is 16 Kbytes. Access to a first block of spatial data will overwrite ½ (i.e. 16 Kbytes divided by 32 Kbytes) of the contents of cache 50. The first block of spatial data is likely to be retained based upon a cache replacement policy which assumes temporal locality, even though the first block may not be accessed again or may not be accessed for a significant period of time. Access to a second block of spatial data then causes the remaining ½ of the contents of cache 50 to be overwritten. Thus, by accessing two blocks of spatial data, cache 50 is completely flushed of its previous contents.

The cache flushing problem is quite pronounced for specialized data types having very large block sizes. For instance, image data commonly has block sizes of 512 Kbytes to 100 Mbytes. Each block not only flushes other data from the cache, but also flushes their own lines of data when the block size is larger than the cache size. Another example of the cache flushing problem arises with regard to the tables that are used in processing an image stream. The tables will typically be replaced by the data of the image stream unless separate buffers are used for the table and image data. Processing an image will generally require several stream buffer sets because multiple streams are used to process a single stream. For example, when an image is scaled, a current line of data and a previous line of data are used to interpolate the lines in between. In other cases, several lines may be merged to produce a new line of data. It is conceivable that eight or sixteen large stream cache sets may be useful for processing image data.

In addition, some types of spatial data have the characteristic of being accessed at regular, though relatively long, intervals. For instance, the data for a particular image may be read out to a display from start to finish in order to feed a raster scan. The subsequent image in a series of images may then only require that a relatively small subset of data positions be updated in the data for the predecessor image. It is therefore advantageous to maintain the relatively large, infrequently accessed image data in cache in preparation for output of the next image. However, in between times when the image data is being accessed, accesses by CPU 10 to other types of data can cause cache controller 30 to replace some of the blocks of the image data resulting in much of the same data having to be reloaded into cache 50.

One solution to this conflict between temporal and spatial data in a cache is to include "spatial locality only" hints in load and store instructions to indicate that the data exhibits spatial locality but not temporal locality. Kurpanek et al describe such a solution in "PA7200: A PA-RISC Processor with Integrated High Performance MP Bus Interface", 1063-6390/94, pp. 375–382, IEEE, 1994. When data marked as "spatial locality only" is accessed, it is read into an assist cache, just as is temporal data. Upon replacement, however, the "spatial locality only" data is flushed back to main memory whereas the temporal data is moved into a main data cache for subsequent access. This prevents spatial data from polluting the cache, but makes no effort to cache the spatial data for further use. The assist cache, however, is still polluted with spatial data.

Another solution to cache pollution caused by spatial data is to provide multiple caches at the same level in the hierarchy of the microprocessor architecture. By dividing the cache into multiple caches which are then assigned to support particular types of data, the characteristics of each cache (e.g. line size, number of lines, replacement policy/priority, write policy, prefetch capability, access latency, etc.) can be optimized for the type of data stored within the cache. For instance, Rivers and Davidson describe a non-temporal streaming (NTS) cache in their article entitled "Reducing Conflicts in Direct-Mapped Caches with a Temporality-Based Design", pp. I-154 to I-163, International Conf. on Parallel Processing, IEEE, 1996.

FIG. 2B illustrates a microprocessor 210 where cache 250 has multiple cache devices at the same level. Data cache 252 and stream buffer cache 254 reside at the same hierarchical level. However, stream buffer cache 254 is assigned to support the streaming of large blocks of data which are known to be spatial in nature. When a block of data is known to be spatial by the programmer, compiler or hardware, then the block is loaded into stream buffer cache 254 instead of data cache 252. The result is that the spatial data stored in stream buffer cache 254 is prevented from polluting the contents of data cache 252.

For example, stream buffer cache 254 can be used to store the data for a sequence of image frames. The data for a first frame is streamed into stream buffer cache 254 and then scanned to output the frame to a display device. The next frame in the sequence is largely the same as the first frame, so only a portion of the data from the first frame needs to be overwritten with the data for the second frame. Thus, only portions of the data for the second frame need to be read into stream buffer cache 254. Meanwhile, temporal data is cached in data cache 252 without overwriting the data for the first image frame and without data for the first or second image frames overwriting the temporal data in data cache 252. It can therefore be seen that caches assigned to specific functions can enhance cache function in a microprocessor.

However, the presence of multiple caches can lead to data concurrency problems. Since data can have temporal and spatial access characteristics in different portions of processing, the same data may end up residing in several caches at the same time which can result in different versions of the data existing concurrently, if the data in one or more caches has been modified.

Rivers and Davidson avoid problems with data coherency in their NTS structure by maintaining only one version of the data in cache. A given set of data can exist in the main cache or the NTS cache, but not both. The NTS scheme requires the use of a nontemporal data detection unit which monitors the references to data and maintains an NT bit which indicates whether the data is non-temporal or not based upon whether the data was rereferenced while in cache. The NTS scheme also requires a secondary cache wherein data blocks that are replaced in the main cache or NT cache are maintained along with their NT bits. A subsequent hit on data in the secondary cache results in the block being moved into the main cache when the NT bit is clear, and into the NT cache when the NT bit is set. If the data is not in the second level cache, then the line is brought in from main memory and no NT information is known. Thus, the NTS scheme solution is based upon dynamic monitoring of the references to a block of data in cache and involves overhead in the form of the storage of an NT bit for each block as well as a secondary cache.

The data concurrency problem can also arise due to the existence of different interfaces to the data present in the software architecture. Generalized data interface routines and instructions may access data at the lowest level in the memory hierarchy in order to ensure that the routine or instruction can be used with the widest variety of calling programs. On the other hand, in order to exploit specialized caches, routines or instructions with specialized data access may be necessary and give rise to a separate interface to the data.

FIG. 3 illustrates an example of the cache coherency problem which arises with the introduction of a separate specialized buffer into the microprocessor architecture. A software data architecture 300 is shown where a main program 310 can call two separate subroutines which interpret data accesses in different ways. Subroutine A 322 interprets a data access data(Z) from main program 310 to be a non-specialized data access to a data set Z and the routine therefore looks first to data cache 252 for data Z and then to main memory 80. Data set Z, if resident in data cache 252, may have been modified so that a modified data set Z' resides in data cache 252.

Subroutine B 324, on the other hand, is structured to interpret a data access data(Z) from main program 310 to be a reference to data in stream buffer. The subroutine therefore looks first to stream buffer cache 254 and then to main memory 80 for the existence of data set Z. If data set Z is resident in stream buffer cache 254 and has been modified without a corresponding update to main memory, then another modified version Z" resides in the stream buffer.

Thus, there are two paths, path A and path B, which main program 310 can take to access a given set of data. The different types of caches therefore creates data coherency problems which must be maintained at the program level through data or code design. Maintaining data coherency at the program level is a complex and error-prone task which has discouraged the use of specialized caches and hindered their proliferation in microprocessor architectures.

The data coherency problem described above is further aggravated by the proliferation of different types of specialized caches in microprocessor architectures. FIG. 4 illustrates a few examples of the types of caches which now appear in conventional microprocessors. In addition to the normal data cache and stream buffer cache, a scratch pad 456 can be included to provide a calculation workspace for a process under execution. Furthermore, a code assignable cache 458 can be provided with characteristics which can be flexibly assigned by the process under execution to, for example, hold tables used in computation. In addition, a cache bypass operation can be viewed abstractly as yet another type of specialized cache set 457 which always results in a cache miss and an access to main memory.

Accordingly, the need remains for a system and method for accessing data which may reside in multiple specialized caches in a microprocessor architecture that is simple and efficient to use.

SUMMARY OF THE INVENTION

It is, therefore, an object of the invention to provide an improved cache structure within a processor architecture.

Another object of the invention is to reduce the level of pollution of the contents of cache sets designed for certain access characteristics by data with conflicting access characteristics.

A further object of the invention is to reduce the level of pollution of the contents of a data cache in the architecture due to data with different access characteristics sharing the same cache buffers.

Finally, it is an objective to provide a simple, low cost solution that guarantees coherency, while freeing the programmer to liberally use specialized sets to improve performance.

An embodiment of a memory system, according to the present invention, includes a main memory adapted to store data and a cache controller coupled to the main memory and adapted to receive a data access request for a selected data set, where the data access request has a corresponding access type indicator. A cache is coupled to the cache controller and adapted to store data, where an access time for the cache is less than an access time for the main memory. The cache includes a plurality of heterogeneous cache sets each adapted to store data and includes first and second cache sets having different characteristics from one another. A control input of the cache receives the access type indicator for the data access request from the cache controller, where the access type indicator can have a value corresponding to the first cache set and another value corresponding to the second cache set. The cache also includes control circuitry for checking each one of the plurality of cache sets for a cache hit regardless of the value of the access type indicator.

An embodiment of a heterogeneous cache apparatus, according to the present invention, includes a plurality of heterogeneous cache sets, wherein each line of each heterogeneous cache set includes a tag, and a plurality of tag comparators. Each tag comparator is coupled to a corresponding one of the heterogeneous cache sets. And each tag comparator is configured to receive at least a portion of an address signal, compare the portion of the address signal to the tag of an indexed line in the corresponding cache set and, responsive to a match between the portion of the address signal and the tag of the indexed line in the corresponding cache set, generates a cache set hit signal. A hit detect circuit is adapted to receive the cache hit signal from each tag comparator and, responsive thereto, generate a general hit signal and a select signal. And a multiplexor is adapted to receive the select signal, the multiplexor being coupled to an external data bus and to each one of the heterogeneous cache sets. The multiplexor is further adapted to interconnect the external data bus to one of the heterogeneous cache sets responsive to the select signal.

An embodiment of a method for accessing memory in a computer architecture, according to the present invention, includes the steps of receiving a data access request from a CPU, wherein the data access request addresses a selected data set and includes an access type, and each value of the access type corresponds to a predetermined data resource, attempting to access the selected data set starting at a highest level of a memory hierarchy regardless of the value of the access type, and attempting to access the selected data set in each data resource in parallel at each level of the memory hierarchy regardless of the value of the access type.

An embodiment of a memory interface architecture for a memory interface having a data type control signal, according to the present invention, includes a memory controller having a unified access point through which each data access request passes regardless of the value of the data type control signal. A hierarchical memory structure is coupled to the memory controller which has multiple levels of memory devices organized based upon an access time of the memory devices at each level of memory with a level of memory having a lowest access time at a top of the structure and a level of memory having a highest access time at a bottom of the hierarchical memory structure, and wherein one of the levels of memory includes multiple heterogeneous sets. The memory controller searches the memory structure for a data set corresponding to each data access request from the top to the bottom of the memory structure and each of the multiple heterogeneous sets are searched in parallel and only a single version of any given data set is permitted to exist at any given level of memory.

The foregoing and other objects, features and advantages of the invention will become more readily apparent from the following detailed description of several embodiments of the invention which proceeds with reference to the accompanying drawings.

DETAILED DESCRIPTION OF THE PRESENT INVENTION

Figure 5:
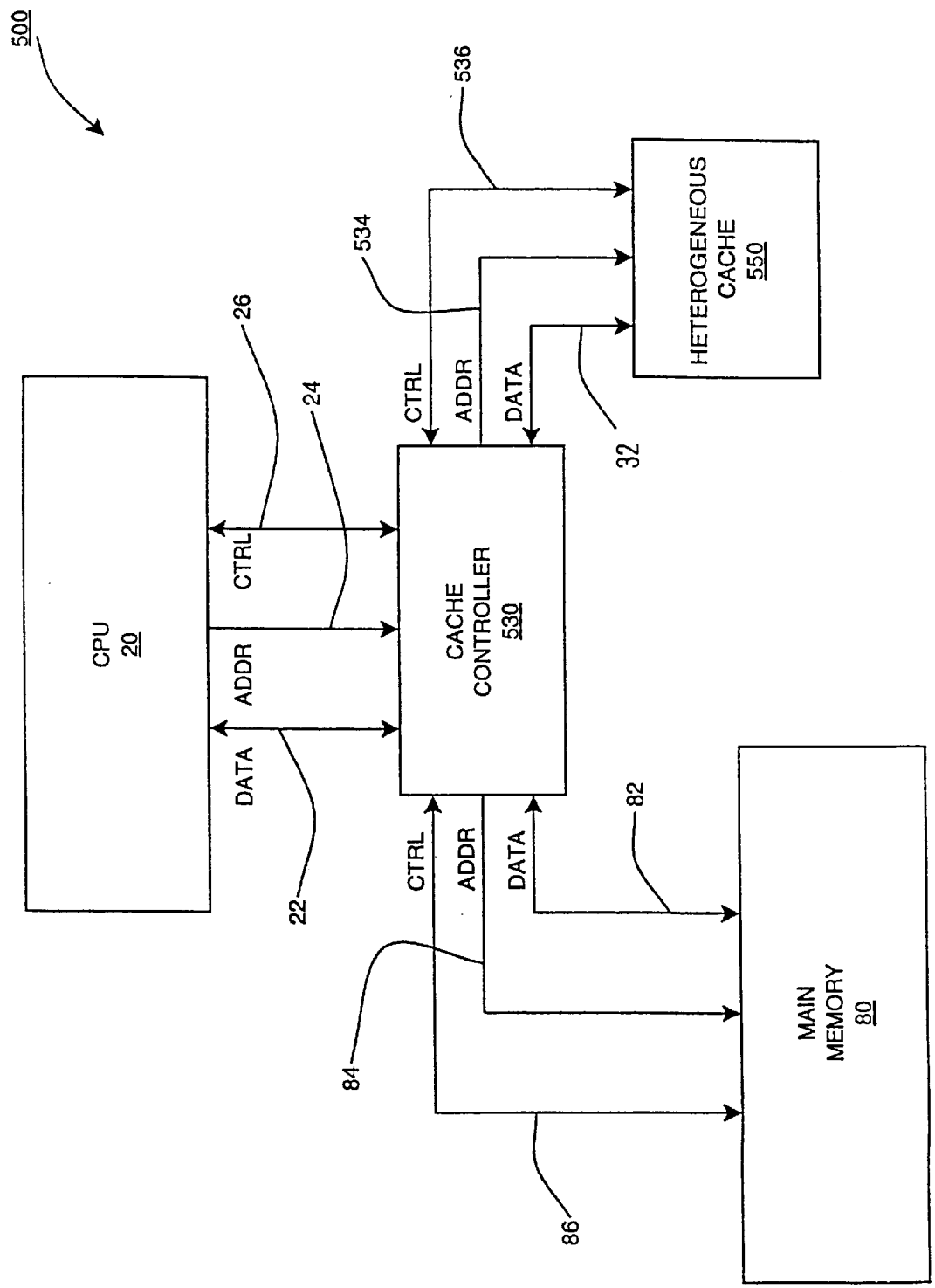
FIG. 5 is a functional block diagram of a microprocessor architecture according to the present invention.

Indicated generally at 500 in FIG. 5 is a microprocessor architecture wherein CPU 20 is coupled to a cache controller 530 which controls accesses from CPU 20 to a heterogeneous cache 550 and main memory 80 in accordance with the present invention. Prior to describing the detailed structure of the microprocessor architecture 500, the key components of the architecture will be identified followed by a brief description of the operation of the system. Then a more detailed description of each of the components will be provided along with a more detailed description of the operation of the architecture. Similar reference numbers are used to identify similar components present in different drawings.

More detailed consideration will now be given to the structure of the architecture 500 of the present invention. CPU 20 is coupled to cache controller 530 via CPU data bus 22, CPU address bus 24 and CPU control bus 26. CPU 20 outputs an address value on address bus 24 along with a corresponding control signal, such as a read/write signal and chip select, on CPU control bus 26. CPU 20 receives and transmits data via data bus 22.

Cache controller 530 is separately connected to both heterogeneous cache 550 and main memory 80. Cache controller 530 writes data to cache and reads data from cache via cache data bus 32. A cache address is output to heterogeneous cache 550 via cache address bus 534. Control signals to cache 550, such as read/write to the cache or a hit signal from the cache, are communicated via cache control bus 536.

Similarly, cache controller 530 communicates with main memory 80 via main memory data bus 82, main memory address bus 84 and main memory control bus 86.

When the CPU 20 accesses data, it typically outputs a data address value corresponding to the data on CPU address bus 24 along with a corresponding read or write signal on CPU control bus 26, and data on CPU data bus 22 if the data access is a write operation, followed by the assertion of a chip select or data strobe signal. Cache controller 530 receives the bus signals from the CPU for the data request.

Figure 6:
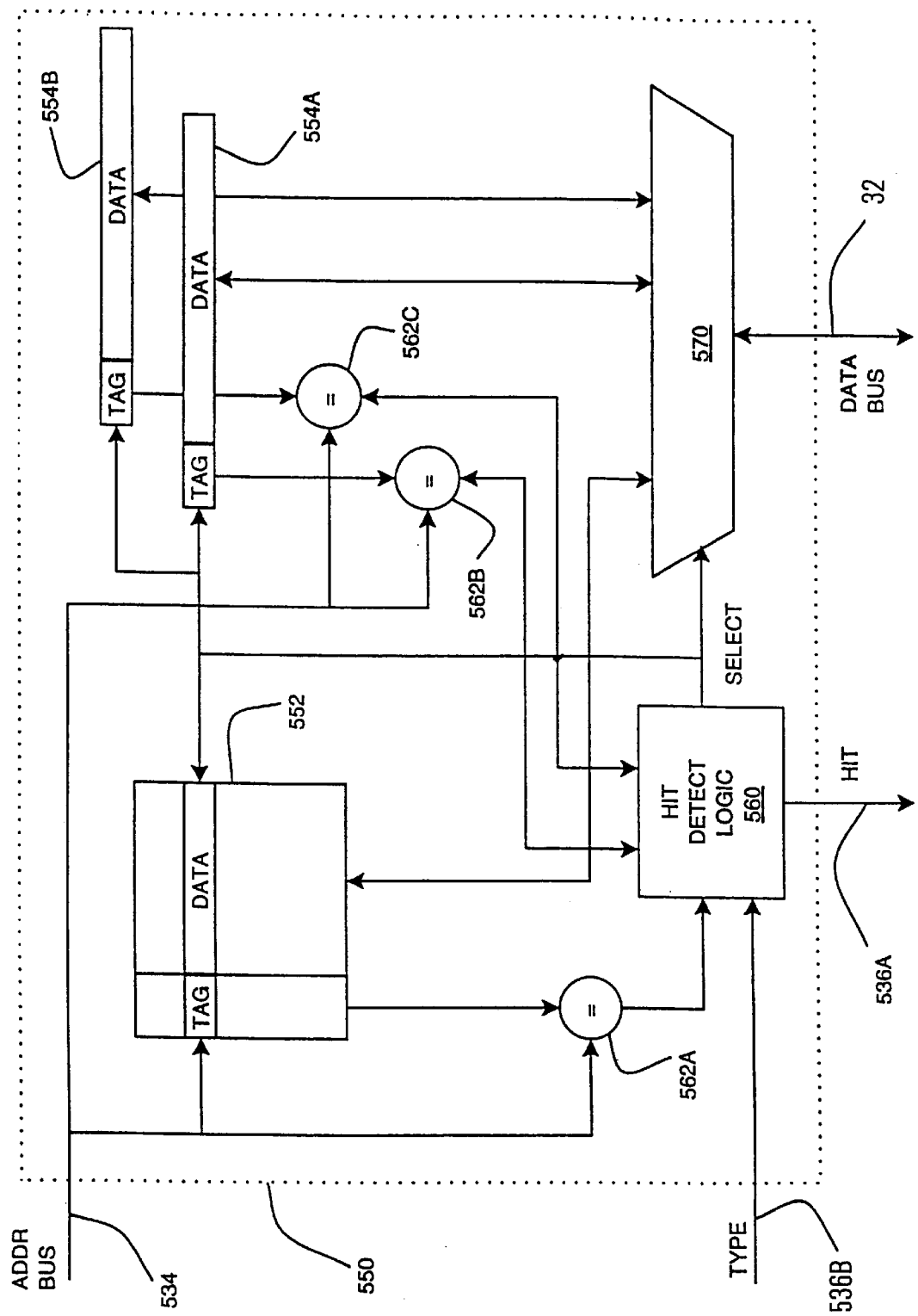
FIG. 6 is a functional block diagram of the heterogeneous cache of FIG. 5 illustrating multiple heterogeneous cache sets.

FIG. 6 illustrates the structure of heterogeneous cache 550 of FIG. 5. Heterogeneous cache 550 includes multiple cache sets with different characteristics. Cache set 552, for example, is a direct mapped cache with a line size and number of lines chosen to maximize the hit rate for general accesses, i.e. data with temporal characteristics. Cache sets 554A and 554B, on the other hand, are each one line sets with long line size and prefetch capability tuned for streaming accesses. Cache sets 554A and 554B function like fully-associative caches with long memory bursts upon refill to better utilize the main memory system.

When an address value is input to cache 550 from cache controller 530 on cache address bus 534, the address value is input to all the cache sets 552, 554A and 554B simultaneously. For the cache set 522, the lower bits of the address index into the cache set and retrieve the associated values. The upper bits of the address value are input to comparator 562A for comparison to the indexed tag value of each set. If the tag value and the upper bits for a cache entry in cache set 552 match, then there is a cache hit in cache set 552 which is output from comparator 562A and input to hit detect logic 560. The data associated with a cache hit is output to a multiplexor (MUX) 570 which will select data for output. In the event of a cache write, the data is input to MUX 570 which inputs the data into the appropriate cache set or sets.

Because there exists only one line per stream set 554A and 554B, the entire address value is used as the cache tag into the sets. Comparators 562B and 562C compare the address value with the tag values of cache sets 554A and 554B respectively in search of a cache hit in the stream cache sets. The output signal from each of comparators 562B and 562C is input to the hit detect logic 560 to indicate a cache hit when a match is found in either cache set 554A or 554B. When a cache hit occurs in either cache set 554A or 554B then the data from the cache set is output to MUX 570, or input to the cache set from MUX 570 in the case of a cache write.

It is important to note that while the cache 550 is illustrated as having a MUX 570, the cache 550 can alternatively be constructed using a bus structure. In a bus structure, data is driven into all sets and only the set selected to receive the data is enabled. For instance, chip enable and write enable signals are input to all the cache sets and only the chip enable and write enable signal for the target cache set are enabled.

The hit detect logic 560 receives the signals from cache sets 552, 554A and 554B and, responsive thereto, generates a HIT signal 536A which indicates to the cache controller 530 that a cache hit has occurred.

A TYPE signal 536B is input to the hit detect logic 560 from the cache controller 530 which indicates the type of access requested by the CPU 20. During either a read or write operation, the hit detect logic 560 ignores the value of the TYPE signal output by the CPU 20 and all cache sets are checked for a match on the requested data. In the event of a cache miss, which results in a line being fetched from main memory, the TYPE signal determines the type of cache set where the incoming line will be stored. For example, if the TYPE signal indicates a stream access, then hit detect logic 560, in response to the cache miss and the TYPE signal value, will select one of stream cache sets 554A and 554B for replacement. The content of the cache set being replaced, if dirty, is then written back to main memory 80 through cache controller 530. Cache controller 530 then retrieves a new line of data from main memory 80 and transfers it to cache 550 via data bus 32. The hit detect logic 560 then selects the replaced cache set to receive the new line of data.

Cache sets 552, 554A and 554B are exemplary in the present invention. There can be many more cache sets of the types illustrated and there can be additional types of caches. For instance, there can be multiple cache sets in addition to cache set 552. Also, there could be a separate cache set tuned for other specific types of functionality, such as a scratch pad cache set or code assignable cache set. What is important in the present invention is that all the cache sets are checked for a cache hit in response to an address input via cache address bus 534.

In previous implementations using specialized caches, the data address value output by the CPU to the cache controller is combined with a data type signal, i.e. stream or normal data, which indicates where the data may reside. A cache bypass type of access will result in the data address value being output directly to main memory 80 on main memory address bus 84 without the contents of cache being examined. If the access is not a cache bypass and there are multiple cache types within the cache, then the type of data access indicates which type of cache set where the data may reside and the conventional cache controller outputs the address value received from the CPU to the cache along with a selection signal for selecting the corresponding type of cache device within the cache.

In contrast, the cache controller 530 of the present invention checks all sources of cache data simultaneously without regard to the data type directive from CPU 20. Each cache set is accessed in parallel so that a cache hit can be quickly determined. Also, by checking for a data match in cache regardless of whether the data access requests another source, such as a bypass access to main memory, the data is obtained from the highest, and fastest, level of memory and the most current and up-to-date data is obtained. There is no performance loss in attempting the parallel accesses to multiple cache sets because those devices not indicated by the data type directive from the CPU 20 will be in an idle state anyway.

Figure 7:
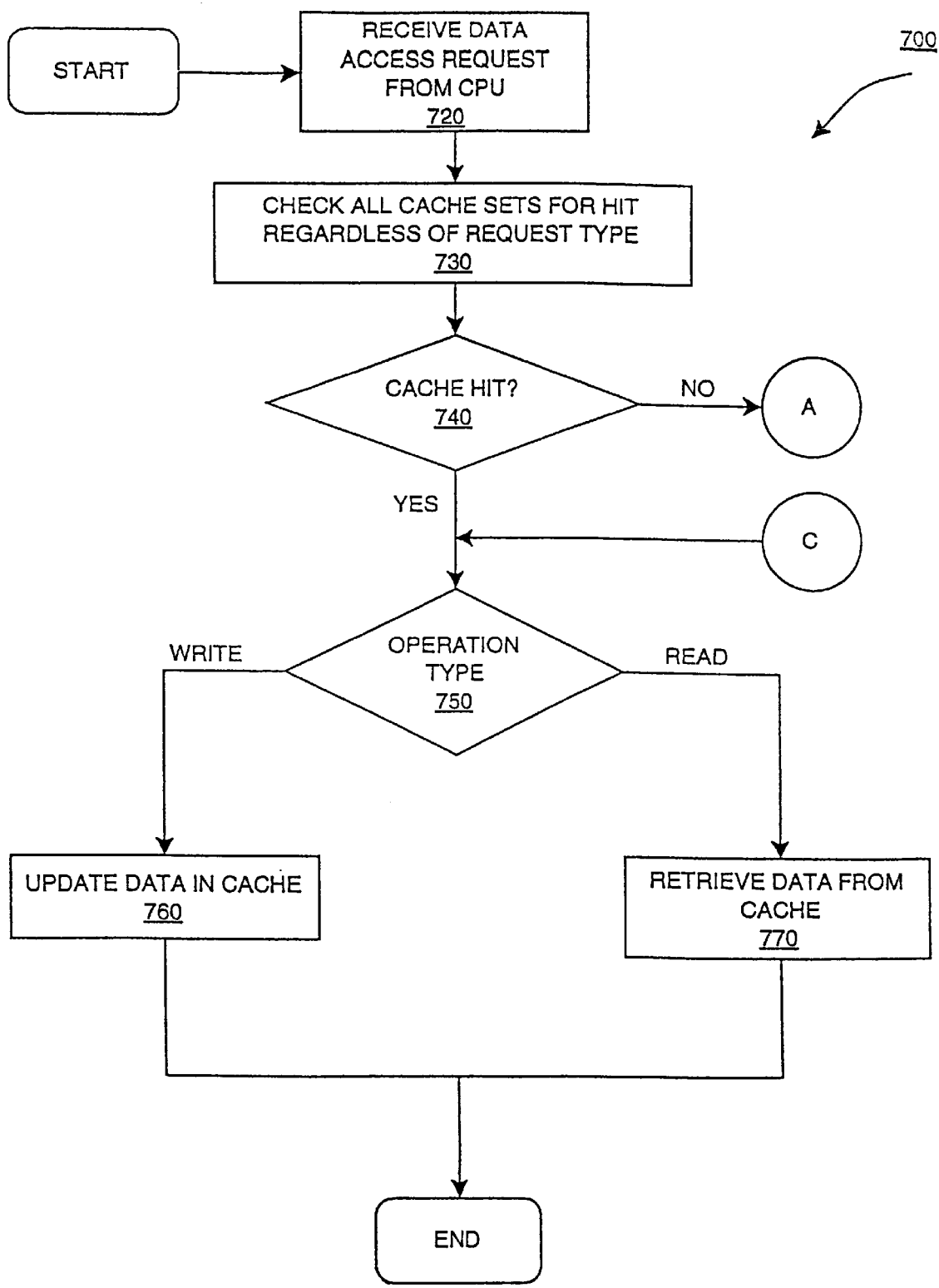
FIG. 7 is a flow diagram of the processing of a data access request in the microprocessor architecture of FIG. 5.
Figure 8A:
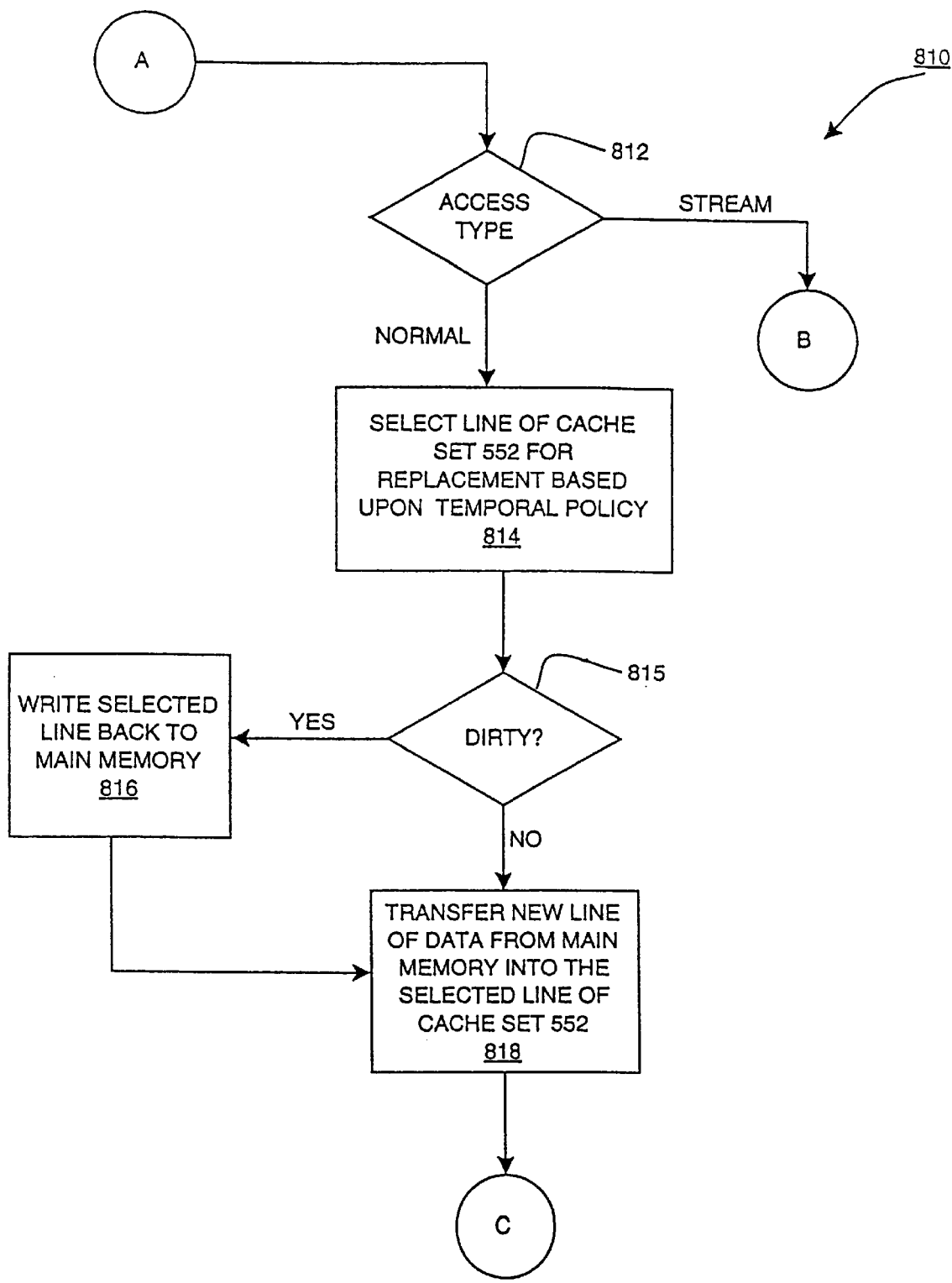
FIG. 8A is a flow diagram extending from FIG. 7 of a NORMAL cache replacement portion of the data access request processing.
Figure 8B:
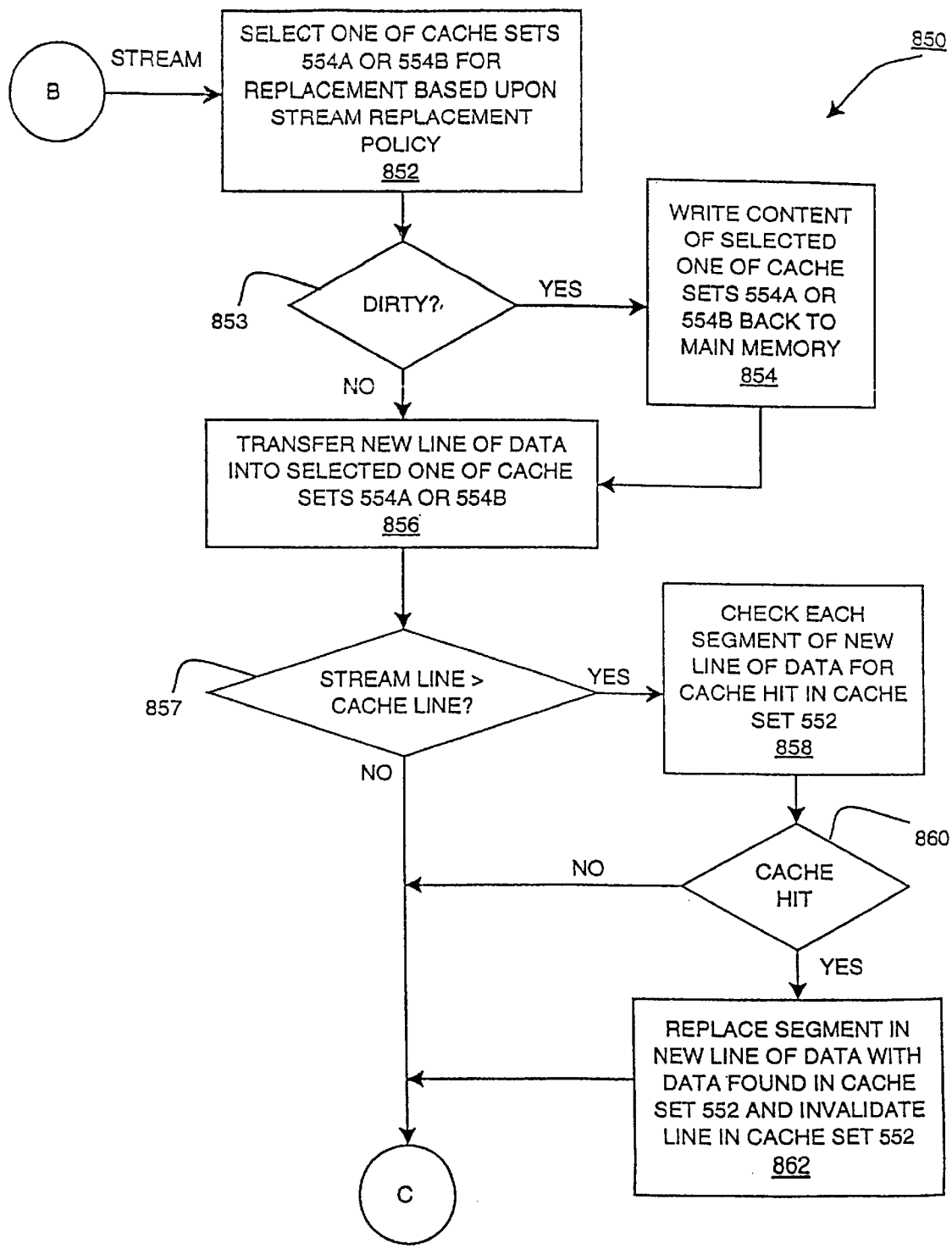
FIG. 8B is a flow diagram extending from FIG. 8A of a stream cache replacement portion of the data access request processing.

FIGS. 7, 8A and 8B are flow diagrams describing the operation of cache controller 530 in the present invention. FIG. 7 shows the main line of processing 700 which takes place in response to a data access request, either a read or a write operation, from the CPU 20. Upon receiving the read request 720, the cache controller 530 places the address value of the read request on cache address bus 534 to cache 550 in FIG. 6. This causes cache 550 to check all cache sets for a match with the address vale of the data request 730. The cache 550 is checked for a match on the address value regardless of the type of data request made by CPU 20. Even if the request from CPU 20 indicates that a cache bypass request would normally directly access main memory, the cache controller 530 will check cache 550 for a match in any type of cache set.

The hit detect logic 560, as described above with respect to FIG. 6, will generate the HIT signal 536A to notify the cache controller 530 that a cache hit has occurred. Processing then proceeds on the basis of whether there is a cache hit or not 740. If there is a cache hit, then processing proceeds on the basis of whether the operation is a read or a write 750.

If the operation is a read, then cache 550 will retrieve the data resident in the matching set in the cache 770 and placed on data bus 32. Cache controller 530 then routes the data to the CPU 20. The data obtained from cache 550 will therefore be the most current version of the data. If the operation is a write, then cache 550 will update the data resident in the matching set in cache at step 760 with the data output by the cache controller 530 on data bus 32.

If there is a cache miss in cache 550, then the data must be retrieved from main memory 80 and placed in cache 550. Thus, if there is a cache miss, then processing proceeds from step 740 to step 812 of FIG. 8A, as indicated by point A in both FIGS. 7 and 8A. At this point, the access type of the read request from CPU 20 is used to determine the type of cache set in which the data will be stored. The data type is determined from a control signal sent from CPU 20 to cache controller 530 via control bus 26. Alternatively, the data type can be derived from a pattern of accesses by CPU 20 rather than an explicit signal or by a combination of CPU signaling and access pattern to determine the access type. Regardless of the manner in which the access type is determined, the access type is output to cache 550 via cache control bus 536 as the TYPE signal 536B shown in FIG. 6.

If the data request is a non-specialized NORMAL access type, then processing proceeds to step 814 and a line from cache set 555 is selected for replacement based upon the NORMAL type line replacement policy. The dirty bits for the line selected for replacement are then checked at step 815. If the dirty bits for the line selected for replacement in cache set 552 indicate that the data has been modified, then the data is written back to main memory 816. Then the data retrieved from main memory 80 is stored in the selected line of cache 552 at step 818. This is accomplished by the cache controller outputting a TYPE signal 536B to cache 550 with a value of NORMAL. The cache 550 will then replace the contents of the selected line in cache set 552 with the new line of data from main memory 80. Processing then returns to FIG. 7, as indicated by point C in FIGS. 7 and 8A.

If the access type is STREAM, then processing proceeds from step 812 to FIG. 8B, as indicated by point B in FIGS. 8A and 8B. One of the stream cache sets 554A and 554B must be selected for replacement at step 852 based upon the replacement policy (i.e. random, least-recently-used (LRU), FIFO, etc.) chosen for the stream cache sets. The dirty bits of the selected cache set are then checked at step 853. If any of the data in the selected cache set has been modified, then the data is written back to main memory 80 at step 854. Then the data retrieved from main memory 80 is transferred into the selected one of the stream cache sets 554A and 554B at step 856.

If the access type is BYPASS, then the access can treated as a NORMAL access type or given specialized treatment wherein the data is retrieved from main memory but is not stored in any of the cache sets.

Processing then proceeds, at step 857, on the basis of whether the line size of cache sets 554A and 554B is larger than the line size of cache set 552. If the lines of cache sets 554A and 554B are longer than the lines of cache set 555, then the incoming data line must be checked at step 858 for a corresponding entry in cache set 552 (step 860). If there is a corresponding entry in cache set 552, then, at step 862, the entry is invalidated and the data in cache 552, if modified, is transferred into the corresponding portion of the line from main memory 80. This is accomplished by the cache controller outputting a TYPE signal 536B to cache 550 with a value of STREAM. The cache 550 will then replace the contents of one of the stream cache sets 554A and 554B with the new line of data from main memory 80. Processing then returns to FIG. 7, as indicated by point C in both FIGS. 7 and 8B.

As noted above, the cache set types here are examples and there can be any number of different specialized cache types, with their corresponding replacement policies, which would each have a unique TYPE value and corresponding branch emanating from the switch point 812 in FIG. 8A.

Figure 1:
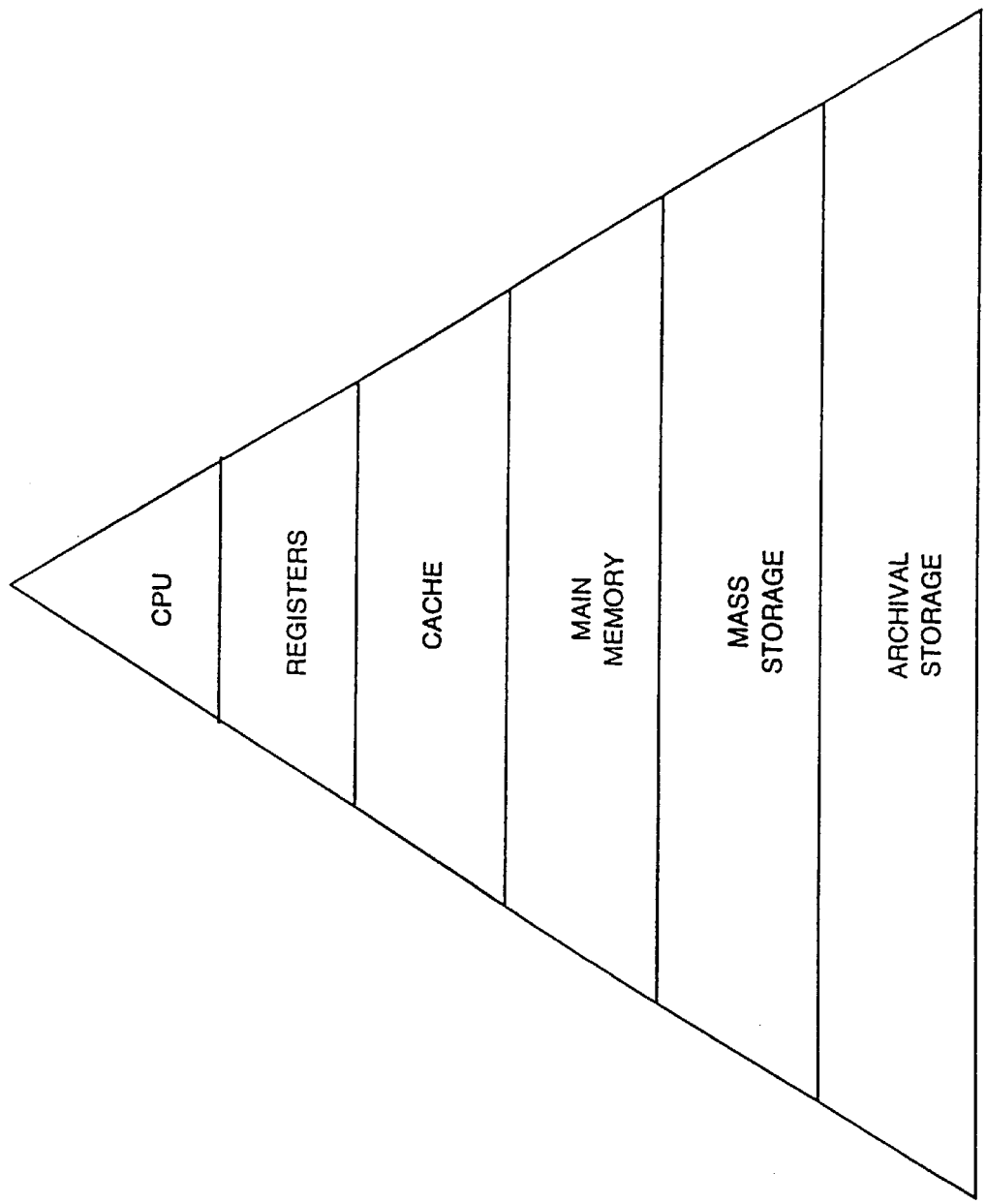
FIG. 1 is a hierarchical diagram illustrating the relationship between different levels of memory in a conventional microprocessor architecture.
Figure 2A:
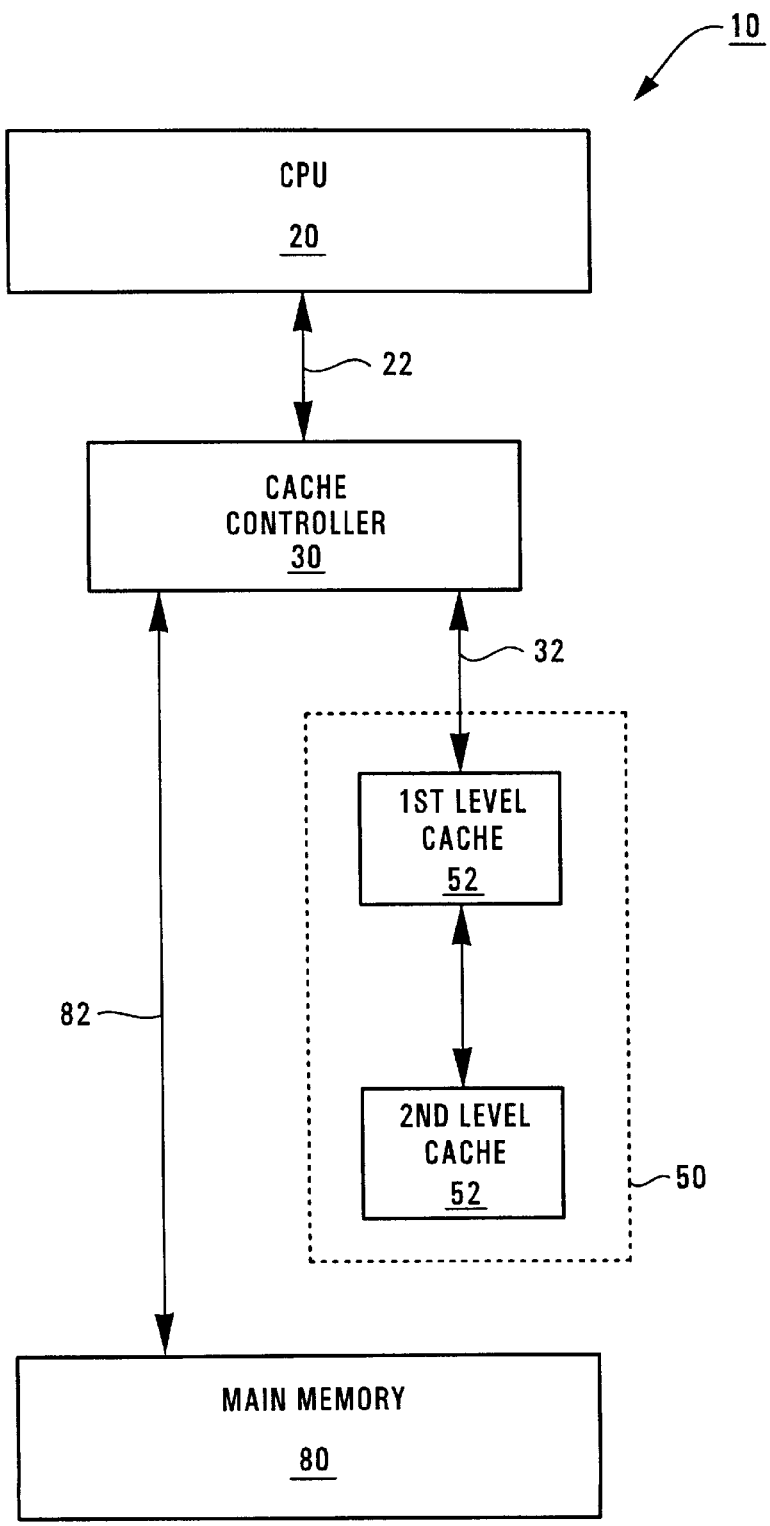
FIG. 2A is a functional block diagram of a conventional microprocessor architecture which includes a two-level cache.
Figure 2B:
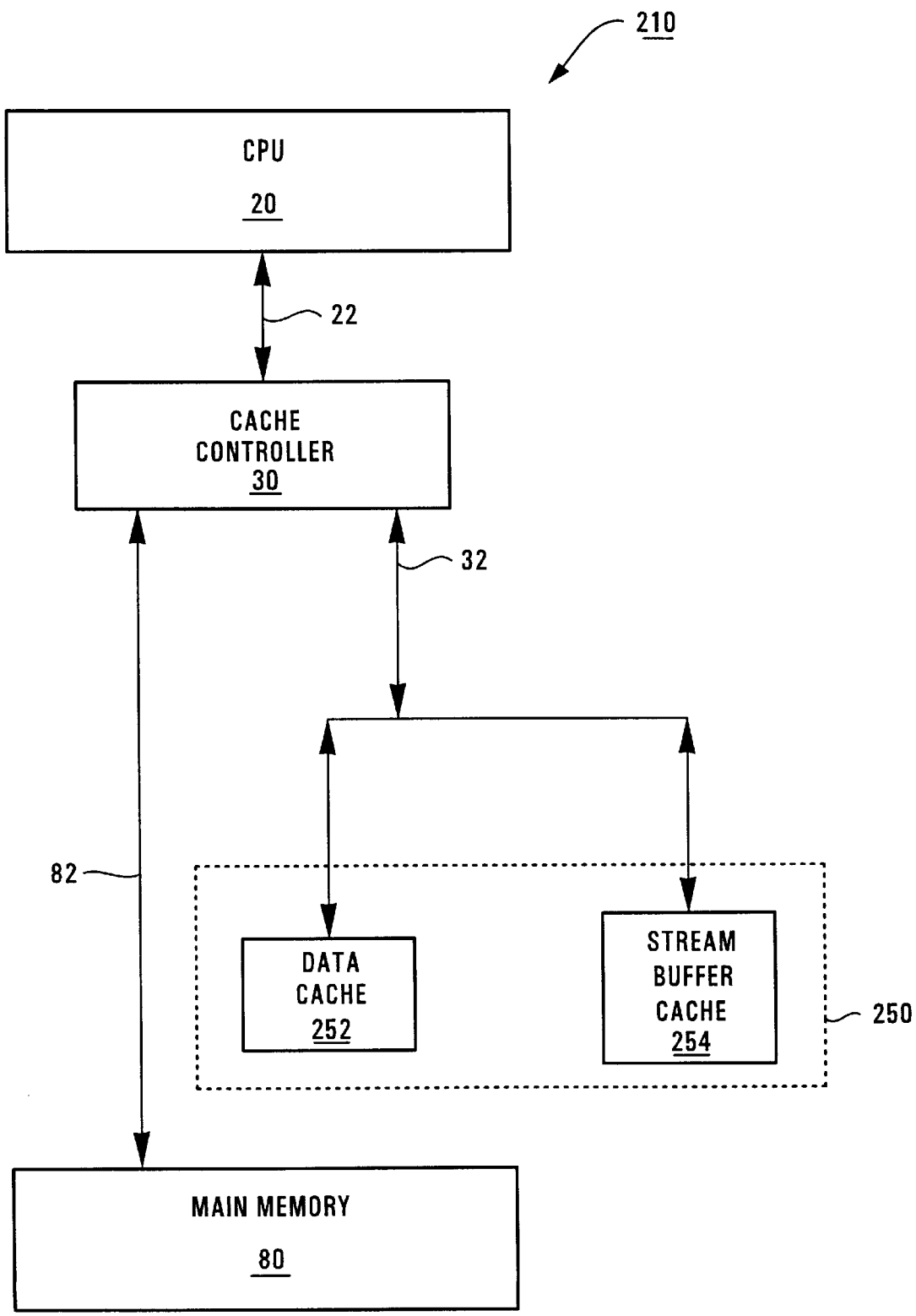
FIG. 2B is a functional block diagram of a conventional microprocessor architecture which includes a cache with two devices in parallel having different specialized functions.
Figure 3:
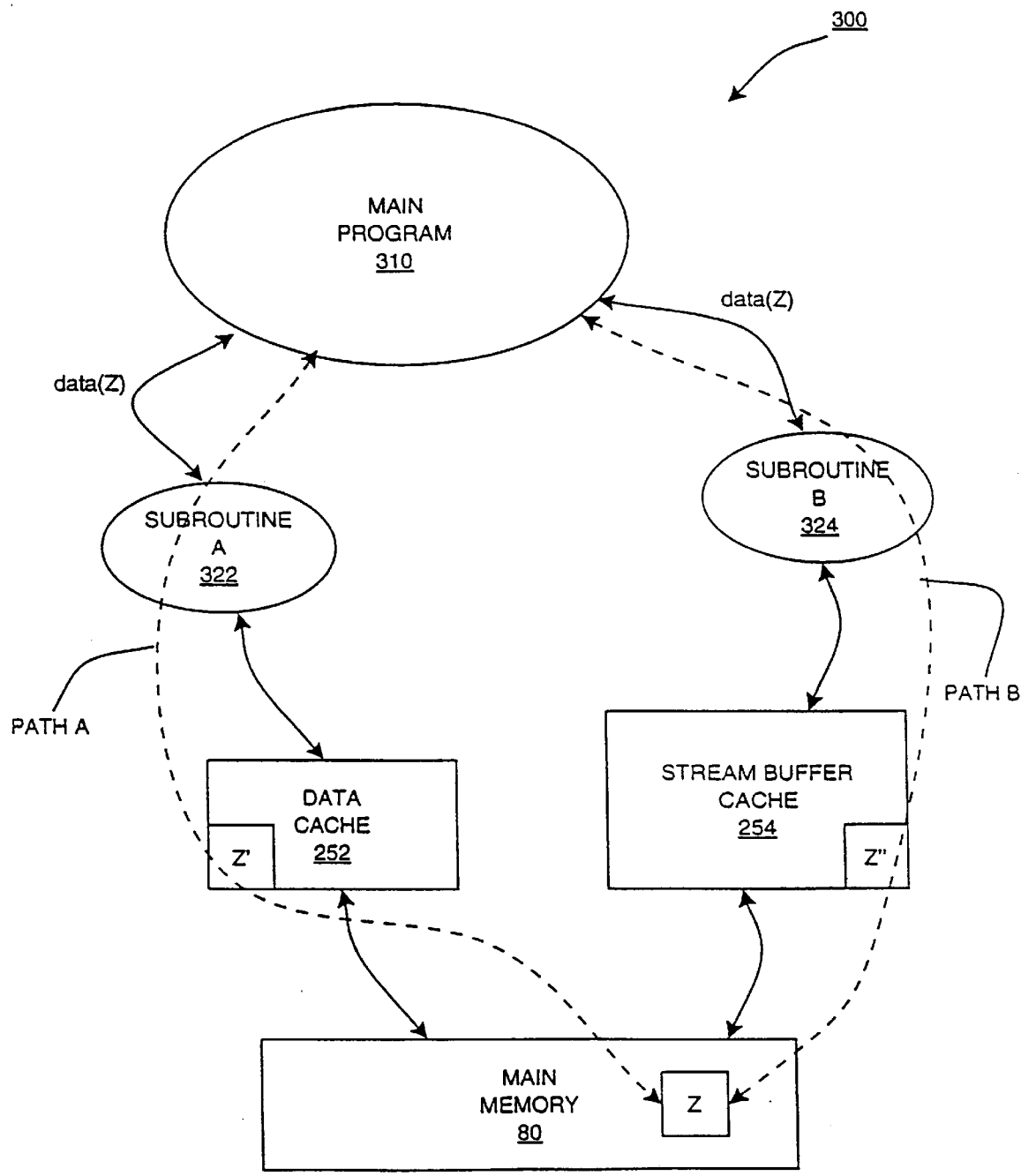
FIG. 3 is a data diagram illustrating an example of a software and data architecture for the microprocessor architecture of FIG. 2B.
Figure 4:
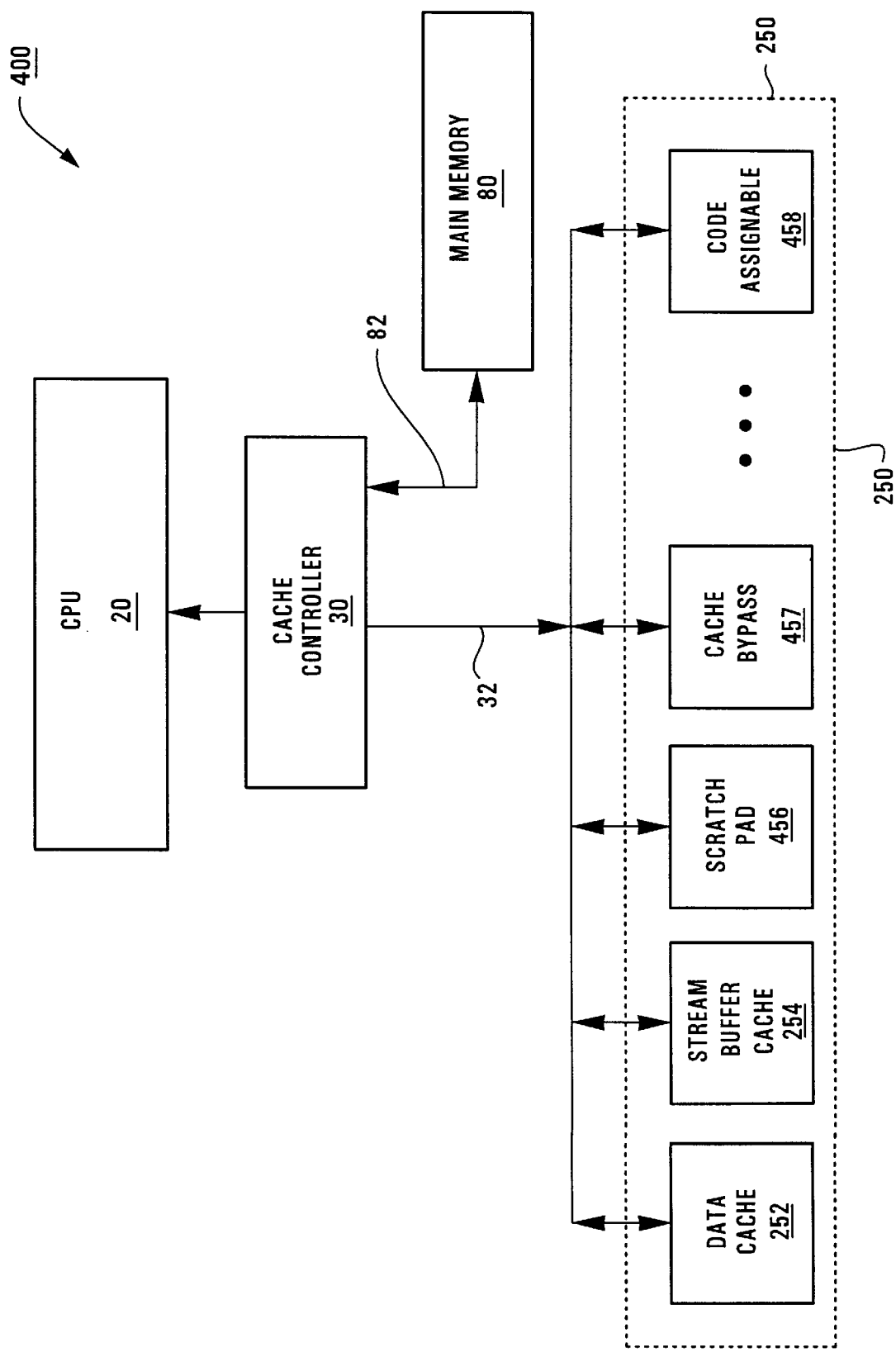
FIG. 4 is a functional block diagram of a conventional microprocessor architecture which includes a cache having multiple devices in parallel.
Figure 9:
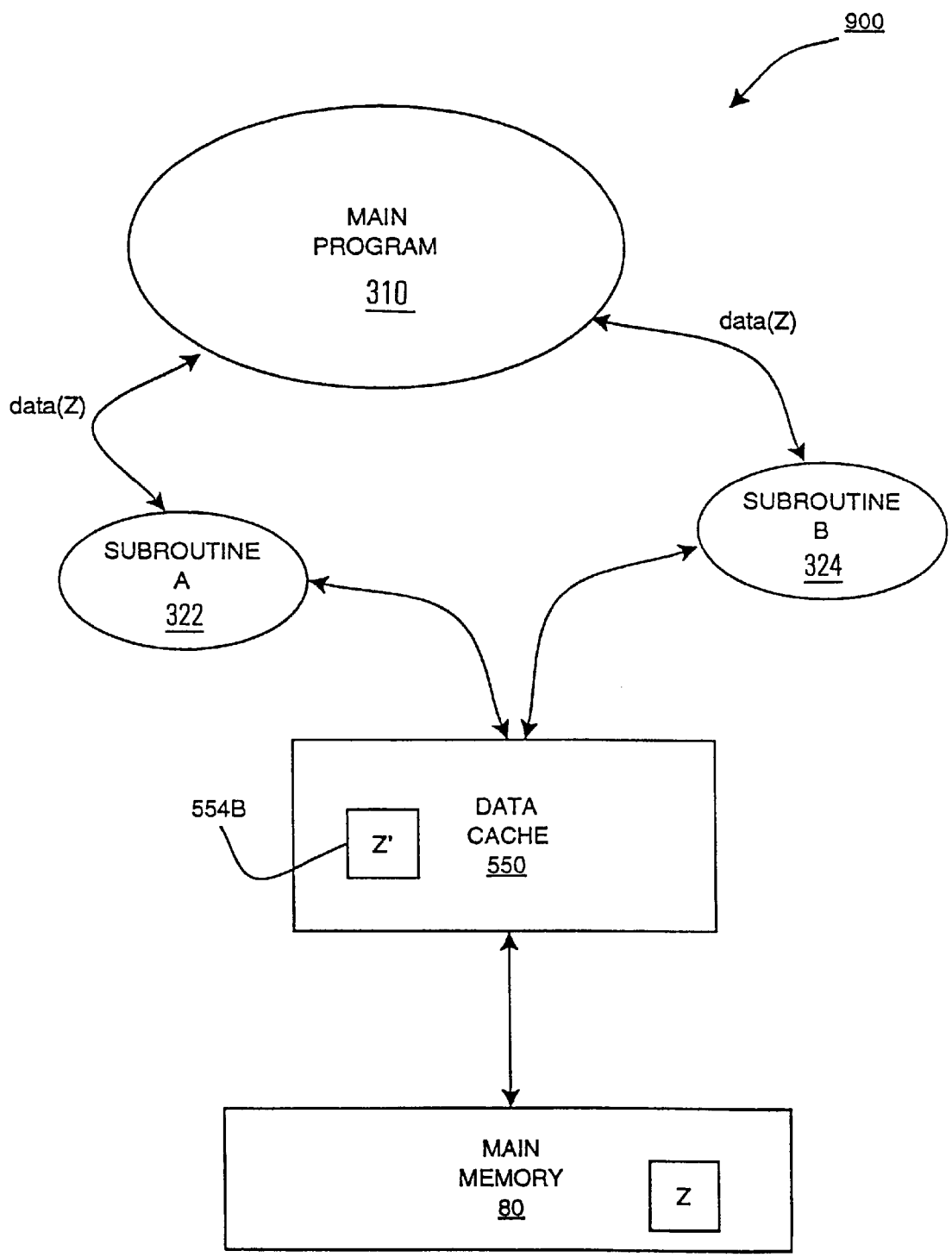
FIG. 9 is a data diagram illustrating an example of a software and data architecture for the microprocessor architecture of FIG. 5.

FIG. 9 is a software and data architecture diagram which modifies the example of data accesses through multiple software modules in FIG. 3 to demonstrate the software data interface of the present invention. In the example of FIG. 9, a part of data Z has been streamed into cache set 554B and modified resulting in data Z' residing in cache set 554B. Regardless of whether the data Z has been accessed relatively recently or frequently, the data Z' will continue to reside in stream cache set 554B rather than the temporally tuned cache set 552. Subroutine A 322 is structured to interpret the TYPE for the data(Z) access from main program 310 as a NORMAL access. Similarly, Subroutine B 324 is structured to interpret the data(Z) request from the main program 310 as a STREAM access.

In the prior art, an access to cache with a NORMAL data type would not find the data Z' residing in cache set 554B, a cache miss would ensue, and the original data Z, which is out-of-date, would be obtained from main memory 80 and returned to CPU 20, as shown in FIG. 3. In the present invention, however, when subroutine A 322 passes the request to cache controller 530 with a TYPE value of NORMAL, the cache 550 ignores the TYPE value and finds the most current data Z' in cache set 554B which is returned to the subroutine 322 and main program 310. Note that if the access TYPE had been BYPASS, then the cache controller 530 would have ignored the TYPE value and still routed the data access to cache 550. Similarly, the data(Z) request from the main program 310 to subroutine B 324 is also routed to cache 550, regardless of the access TYPE, by cache controller 530 and all cache sets will be checked for the data Z. Current data Z' will be found in cache set 554B and returned to Subroutine B 324.

Figure 10:
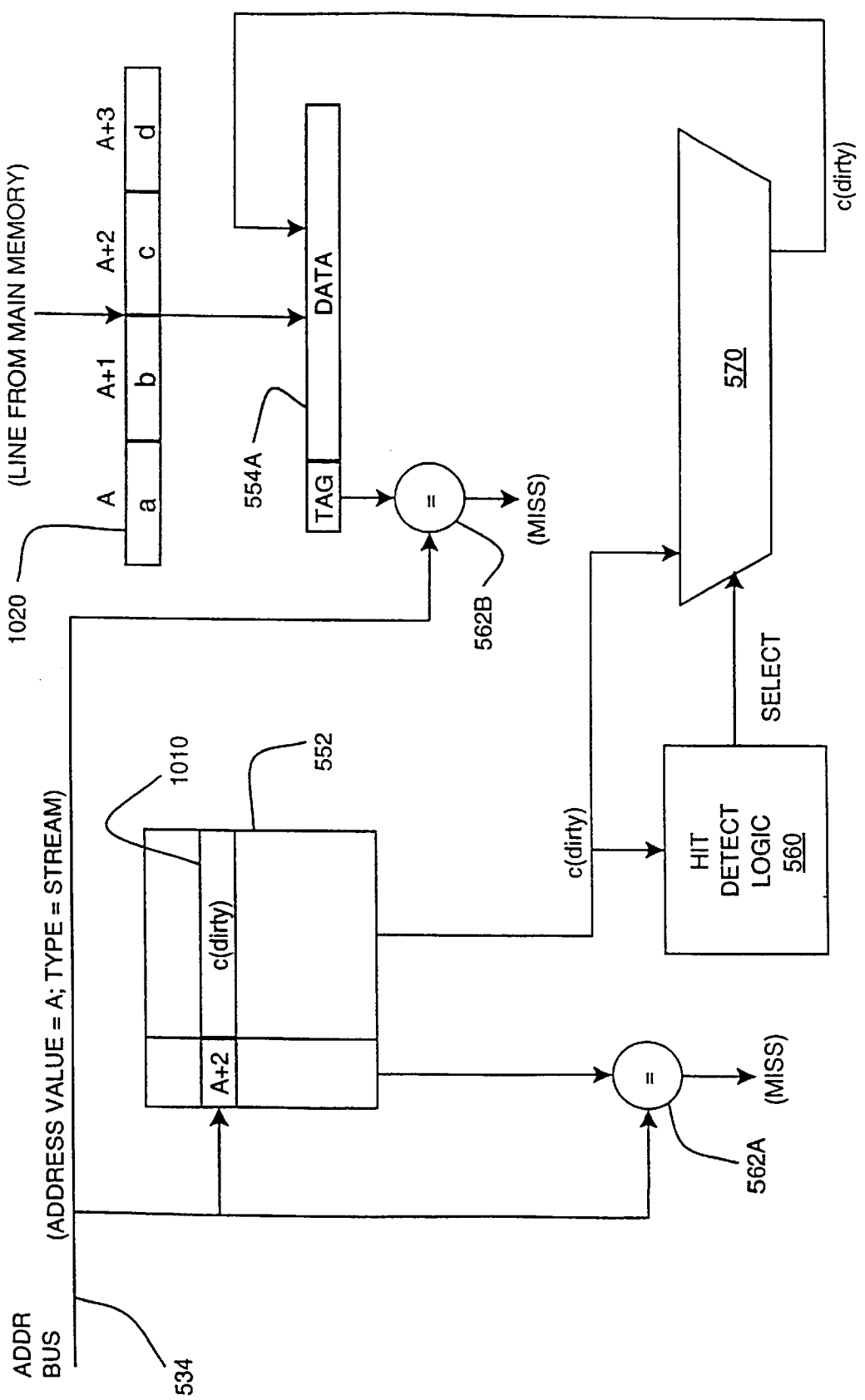
FIG. 10 is a functional block diagram illustrating an example of the function of the cache according to the present invention when a long line of data is read into a cache set of FIG. 6 where the long line includes data already resident in another cache set having a shorter line length.

The problem which arises when the cache sets in cache 550 have different line sizes is further illustrated in FIG. 10. In this example, a cache entry exists for an address "A+2" in temporal cache set 552 and the data "c" in the cache entry is dirty (has been modified) and has not been written back-to main memory 80. A data request with an address value of "A" and an access type of STREAM is input to cache 550 from cache controller 530 via cache address bus 534. The address value "A" results in a cache miss in both sets and, because the data type is STREAM, a line of data is fetched from main memory 80 into stream cache set 554A. The fetched line 1020 include contents for addresses A, A+1, A+2, and A+3. This situation arises because the line length of cache set 552 is different from the line length of cache set 554A.

In the present invention, when a new line of data 1020 is read from main memory, the cache sets having shorter line lengths, such as cache set 552, are checked to determine whether they hold any portion of the incoming line of data 1020. If a portion of the fetched line 1020 resides in another cache set, i.e. the entry 1010 for A+2 of cache set 552 in the example of FIG. 10, then the line in cache set 552 is invalidated. Further, if the existing cache data 1010 in cache set 552 is dirty, then the dirty data is used to replace the corresponding data in the fetched line 1020.

In the example of FIG. 10, the incoming line 1020 contains an entry for address "A+2" which contains unmodified data "c". Cache set 552, which has a shorter line length than cache set 554A, is checked for entries corresponding to the words in the incoming line from main memory 1020. This results in a hit on the entry 1010 for "A+2" in cache set 552 which is detected by the hit detect logic 560. The dirty bit for entry 1010 is checked by the hit detect logic 560 and the dirty bit indicates that the data c(dirty) in cache set 552 has been modified. The data c(dirty) is selected by the hit detect logic for transfer, through MUX 570, into the location in cache set 554A for address "A+2". Entry 1010 in cache set 552 is invalidated. Note that if all sets in cache 550 have the same size line, then the other sets do not need to be checked.

There exists yet another approach toward maintaining data coherency with cache sets having different line lengths by focusing on the cache set having the shortest line length. In the shortest line approach, data coherency is handled when a memory access hits in multiple cache sets and when writing back data.

First, it should be noted that a data entry can only reside in multiple cache sets when a line is loaded from main memory which has a line length that is greater than at least one other cache set in the same level of memory. If the data instance was already resident in a cache set having the longer line length, then the cache access would have resulted in a cache hit upon the long line cache set. Therefore, for there to be multiple entries for the same data, the data must have first resided in a cache set having a shorter line length.

The shortest line length approach relies upon accessing the data in the cache set having the shortest line length of all the caches containing a hit upon the given data. Therefore, if a cache hit occurs in multiple sets, then the access is completed to the cache set having the shorter line length. This is true whether the access operation is a read or a write. Thus, step 760 of FIG. 7 must be modified to update the data in the cache set having the shortest line length, i.e. cache set 552, when a cache hit occurs in both cache set 552 and one of cache sets 554A and 554B. Similarly, step 770 of FIG. 7 is modified to read data from cache set 552 when a cache hit occurs in both cache set 552 and one of cache sets 554A and 554B.

If a hit occurs in only one cache set, then access is completed to that set, as is done above. However, if a cache miss occurs, then the corresponding line from main memory is loaded into a cache set based upon the access type. No checking is performed on the incoming line of data to determine if there is another entry for the same data in a shorter cache set.

However, when the line being replaced is dirty and is held in a cache set having a shorter line length than other cache sets in the cache, then the line being replaced must be sent to the longer line cache sets to check for a cache hit. If a cache hit occurs in one of these longer cache sets, then the longer cache set updates its contents with the modified data from the shorter cache set.

Figure 11A:
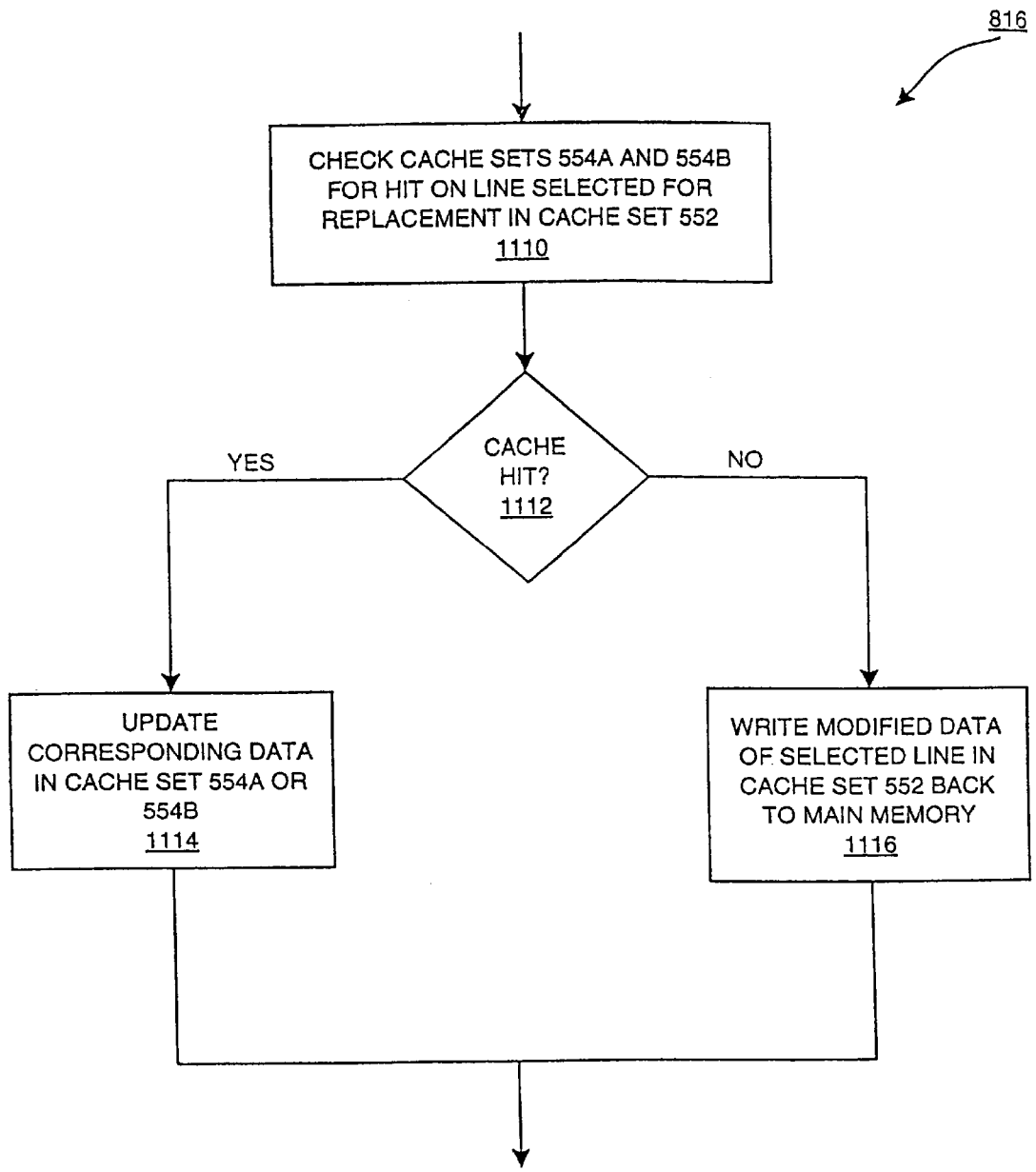
FIGS. 11A and 11B are flow diagrams illustrating revisions to the flow diagrams of FIGS. 8A and 8B for another embodiment of the processing, according to the present invention, of a data access request in the microprocessor architecture of FIG. 5.

Thus, step 816 of FIG. 8A is replaced with steps 1110, 1112, 1114 and 1116 of FIG. 11A. In step 1110, the shortest line length approach calls for checking cache sets 554A and 554B for a corresponding data entry when a dirty entry in cache set 552 is written back to memory 80. If there is a cache hit in one of cache sets 554A and 554B, then control branches at step 1112 to step 1114 to update any corresponding entry in cache set 554A or 554B with the modified data from cache set 552. If there is no cache hit in either of cache sets 554A or 554B then control branches at step 1112 to step 1116 where the modified data from cache set 552 is written back to memory 80.

Note that steps 1110 and 1114 of checking the other cache sets for a hit and updating the data can be performed in the background while a new line of data is being fetched from main memory 80. Thus, there is likely to be no performance penalty for performing these steps.

Figure 11B:
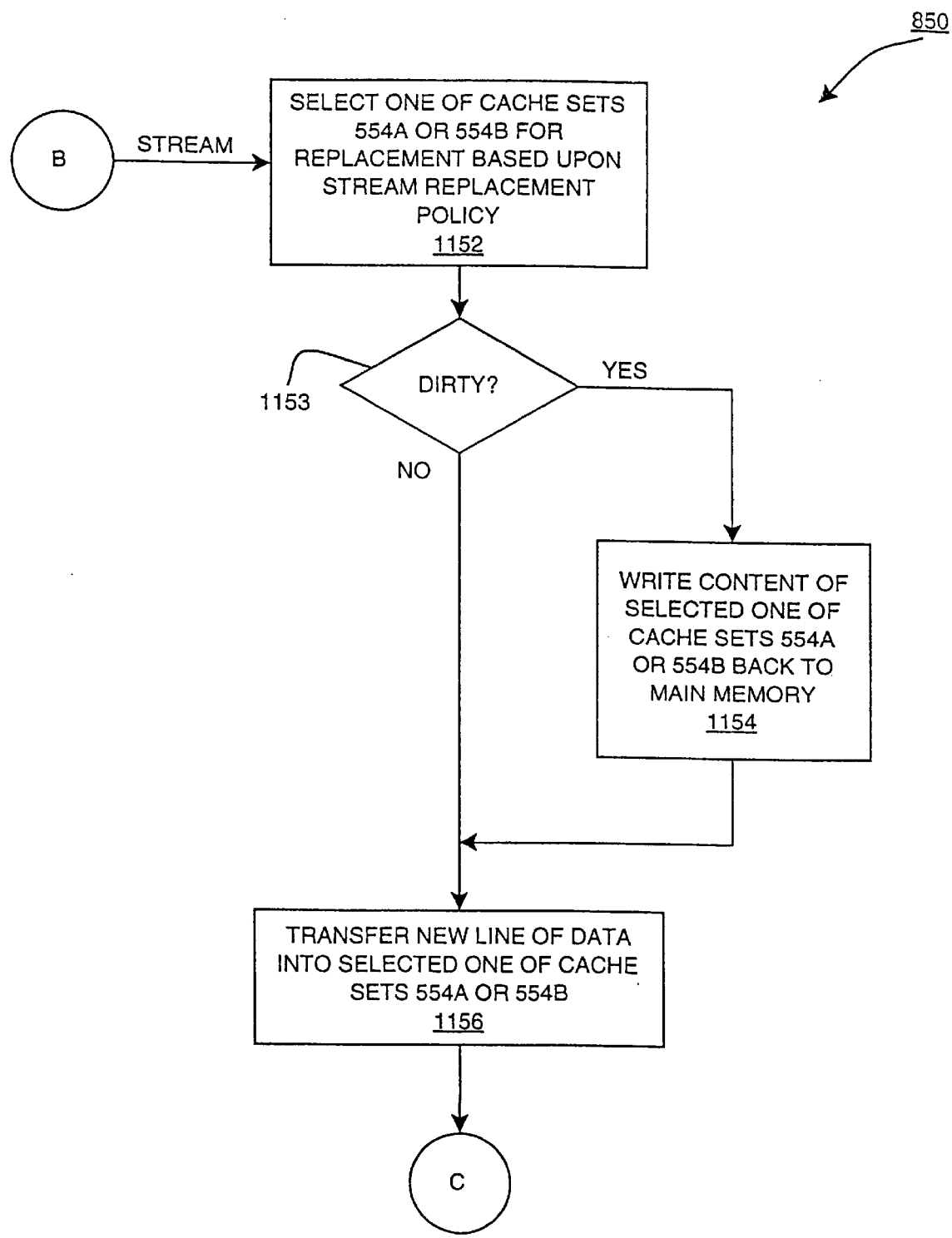

The write-back procedure for cache sets 554A and 554B having the longer line length is significantly simplified in the second embodiment. The longer line cache sets are simply written back to memory and replaced with a new line without regard to the contents of the shorter cache sets. FIG. 11B illustrates an embodiment of the write-back process 850 with the shortest line length approach. When control branches for a STREAM type access at step 812 of FIG. 8A, then one of cache sets 554A or 554B is selected for replacement at step 1152, which is essentially identical to step 852 of FIG. 8B.

Then the line of data from the selected one of cache sets 554A or 554B is checked at step 1153 to see if it contains modified data. If there is modified data, then the line is written back to memory at step 1154. Then, regardless of whether there is modified data or not, the new line of data from memory is transferred into the selected cache set at step 1156.

If there is corresponding data in cache set 552 that has been more recently updated, then that data will be written back to memory when the data is replaced in cache set 552. However, a comparison of FIGS. 8B and 11B readily demonstrates that the write-back process is much simpler in the shortest line approach.

The microprocessor architecture according to the present invention maintains the coherency of data in the presence of multiple specialized cache sets within a heterogeneous cache. The present invention maintains data coherency regardless of the program being executed which simplifies code development using specialized cache types and makes the architecture more resilient to programming errors. The present invention also improves performance by obtaining data from the highest level in memory where the data resides, regardless of the level of memory indicated by the program code.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A memory system, the system comprising:
a main memory adapted to store data;
a cache controller coupled to the main memory, the cache controller being adapted to receive a data access request for a selected data set, the data access request having a corresponding access type indicator; and
a cache coupled to the cache controller and adapted to store data, where an access time for the cache is less than an access time for the main memory, and wherein the cache includes:
a plurality of heterogeneous cache sets each adapted to store data and including first and second cache sets having different characteristics from one another,
a control input for receiving the access type indicator for the data access request from the cache controller, where the access type indicator can have a value corresponding to the first cache set and another value corresponding to the second cache set, and
control circuitry for checking each one of the plurality of cache sets for a cache hit regardless of the value of the access type indicator.

2. The memory system of claim 1, the cache controller being operative, responsive to the data access request, to attempt to access the selected data set in the cache before attempting to access the selected data set in the main memory regardless of the value of the access type indicator.

3. The memory system of claim 2, wherein the access type indicator includes a bypass value indicating that the cache controller should bypass cache and attempt to access the selected data set in main memory, the cache controller being configured to search the cache for the selected data set and then search the main memory if the data set is not found in the cache.

4. The memory system of claim 1, the cache being operative, responsive to a cache miss due to the data access request, to select one of the plurality of cache sets to receive the selected data set based upon the value of the access type indicator corresponding to the data access request.

5. The memory system of claim 4, wherein a line length of the first cache set is less than a line length of the second cache set and wherein the control circuitry is operative to check each word of an incoming line of data for a matching word in the first cache set responsive to transfer of the incoming line of data from main memory into the second cache set, and wherein each line in the first cache set having at least one matching word is invalidated, and each matching word in the first cache set that contains modified data is transferred to the corresponding word of the incoming line of data in the second cache set.

6. The memory system of claim 4, wherein a line length of the first cache set is less than a line length of the second cache set wherein the control circuitry is operative to access the selected data set in the first cache set when both the first and second cache sets contain the selected data set, and further wherein the control circuitry is operative to check each modified word of the first cache set for a matching word in the second cache set when the contents of the first cache set is replaced and replace each matching word in the second cache set with the corresponding modified word of the first cache set.

7. The memory system of claim 4, wherein the replacement policy and line length of the first cache set are selected for efficient access to data with temporal locality, and wherein the replacement policy and line length of the second cache set are selected for efficient access to data with spatial locality.

8. The memory system of claim 3, wherein the number of heterogeneous cache sets of the plurality of heterogeneous cache sets is selected for a predetermined access behavior.

9. The memory system of claim 8, wherein the line size, number of lines, replacement policy, write policy, prefetch capability and access latency of each one of the plurality of heterogeneous cache sets is selected for the predetermined access behavior.

10. A heterogeneous cache apparatus, the apparatus comprising:
a plurality of heterogeneous cache sets, wherein each line of each heterogeneous cache set includes a tag and a dirty bit, and wherein the plurality of heterogeneous cache sets includes first and second cache sets, where a line length of the first cache set is less than a line length of a second cache set;

a plurality of tag comparators, wherein each tag comparator is coupled to a corresponding one of the heterogeneous cache sets, and wherein each tag comparator is configured to receive at least a portion of an address signal, compare the portion of the address signal to the tag of an indexed line in the corresponding cache set and, responsive to a match between the portion of the address signal and the tag of the indexed line in the corresponding cache set, generates a cache set hit signal;

a hit detect circuit operative to receive the cache hit signal from each tag comparator, responsive thereto, to generate a general hit signal and select signal, and to generate an address value for each word of an incoming line of the second cache set and input the address value for each word into the tag comparator corresponding to the first cache set in order to detect a matching line of the first cache set, wherein the hit detect circuit includes hit detect logic to receive a dirty bit from each word of the matching line of the first cache set and, responsive to a first value of the dirty bit, transfer the content of each dirty word of the matching line of the first cache set to the corresponding word in the incoming line of the second cache set and invalidate the matching line in the first cache set; and a multiplexor operative to receive the select signal, the multiplexor being coupled to an external data bus and to each one of the heterogeneous cache sets, wherein the multiplexor is further operative to interconnect the extenal data bus to one of the heterogeneous cache sets responsive to the select signal.

11. The apparatus of claim 10, wherein a replacement policy and the line length for the first cache set are selected for efficiency in capturing data having temporal locality, and wherein a replacement policy and the line length for the second cache set are selected for efficiency in capturing data having spatial locality.

12. The apparatus of claim 11, wherein the hit detect circuit is further configured to receive a data type control signal and select one of the lines from the first cache set for storage of data responsive to a first value of the data type control signal and select one of the lines from the second cache for set storage of data responsive to a second value of the data type control signal.

13. A heterogeneous cache apparatus, the apparatus comprising:

a plurality of heterogeneous cache sets, wherein each line of each heterogeneous cache set includes a tag and a dirty bit, and wherein the plurality of heterogeneous cache sets includes first and second cache sets, where a line length of the first cache set is less than a line length of a second cache set;

a plurality of tag comparators, wherein each tag comparator is coupled to a corresponding one of the heterogeneous cache sets, and wherein each tag comparator is configured to receive at least a portion of an address signal, compare the portion of the address signal to the tag of an indexed line in the corresponding cache set and, responsive to a match between the portion of the address signal and the tag of the indexed line in the corresponding cache set, generates a cache set hit signal;

a hit detect circuit operative to receive the cache hit signal from each tag comparator, responsive thereto, to generate a general hit signal and a select signal, to select the first cache set when the tag comparators for both the first and second cache sets each generate the cache hit signal, and to receive a dirty bit from each word of the first cache set and, when a line of the first cache set is selected for replacement, generate an address value for the line selected for replacement for input to the tag comparator corresponding to the second cache set and generate the select signal such that the content of the line selected for replacement is interconnected to the second cache set; and a multiplexor operative to receive the select signal, the miltiplexor being coupled to an external data bus and to each one of the heterogeneous cache sets, wherein the multiplexor is further operative to interconnect the external data bus to one of the heterogeneous cache sets responsive to the select signal.

14. A method for accessing memory in a computer architecture, the method comprising the steps:

receiving a data access request from a CPU, wherein the data access request addresses a selected data set and includes an access type, wherein each value of the access type corresponds to a predetermined data resource;

attempting to access the selected data set starting at a highest level of a memory hierarchy regardless of the value of the access type; and attempting to access the selected data set in each data resource in parallel at each level of the memory hierarchy regardless of the value of the access type.

15. The method of claim 14, wherein the memory hierarchy includes a cache level, wherein the cache level includes multiple heterogeneous cache sets.

16. The method of claim 15, including determining a population of at least one of the heterogeneous cache sets based upon the access type of the data access request.

17. The method of claim 16, wherein a first cache set of the heterogeneous cache sets has a line length which is less than a line length of a second cache set of the heterogeneous cache sets and the method includes:

transferring a corresponding line of data from a main memory level to the second cache set responsive to a cache miss on the selected data set;

checking each word of the corresponding line of data in the second cache set for a matching word in the first cache set; and updating each word of the corresponding line of data in the second cache set having a matching word in the first cache set with the data from the matching word when the matching word contains modified data.

18. The method of claim 17, including the step of selecting characteristics for each one of the heterogeneous sets which improve access efficiency for a predetermined type of data.

19. The method of claim 18, wherein the characteristics of the first cache set are selected for efficient access of data having temporal locality and the characteristics of the second cache set are selected for efficient access of data having spatial locality.

20. The method of claim 15, wherein a first cache set of the heterogeneous cache sets has a line length which is less than a line length of a second cache set of the heterogeneous cache sets and the method includes:

accessing the selected data set in the first cache set when the selected data set resides in both the first and second cache sets; and checking each modified word of a replaced line of the first cache set for a corresponding word in the second cache set and updating the corresponding word in the second cache set with the modified word of the replaced line of the first cache set.

21. The method of claim 14, wherein the access type value is determined by one of a programmer, a compiler and a hardware circuit.

22. A memory interface architecture for a memory interface having a data type control signal, the architecture comprising:
  a memory controller having a unified access point through which each data access request passes regardless of the value of the data type control signal;
  a hierarchical memory structure coupled to the memory controller, the memory structure having multiple levels of memory devices organized based upon an access time of the memory devices at each level of memory with a level of memory having a lowest access time at a top of the structure and a level of memory having a highest access time at a bottom of the hierarchical memory structure, and wherein one of the levels of memory includes multiple heterogeneous sets; and
  wherein the memory controller searches the memory structure for a data set corresponding to each data access request from the top to the bottom of the memory structure and wherein each of the multiple heterogeneous sets are searched in parallel and only a single version of any given data set is permitted to be accessed at any given level of memory.

23. The memory interface architecture of claim 22, wherein the memory controller transfers a selected data line corresponding to a given data access request to the level of memory having multiple heterogeneous sets from a lower level of memory and the memory controller stores the selected data line in one of the heterogeneous sets based upon a value of the data type control signal corresponding to the given data access request.

24. The memory interface architecture of claim 23, wherein the memory controller checks each word of the selected data line for a matching word in any of the heterogeneous cache sets which have a line length that is shorter than a line length of the one of the heterogeneous sets where the selected data set is stored and where, if the matching word is found and contains modified data, the memory controller transfers the modified data to the corresponding word of the selected data set.

25. The memory interface architecture of claim 22, wherein the memory controller replaces a data line of one of the heterogeneous cache sets and checks each modified word of the replaced data line for a matching word in any of the heterogeneous cache sets which have a line length that is longer than a line length of the one of the heterogeneous sets where the replaced data line is stored and where, if the matching word is found, then the memory controller transfers the modified word to the matching word.

* * * * *

UNITED STATES PATENT AND TRADEMARK OFFICE
CERTIFICATE OF CORRECTION

PATENT NO.   : 6,243,791 B1
DATED        : June 5, 2001
INVENTOR(S)  : Gary Lee Vondran, Jr.

It is certified that error appears in the above-identified patent and that said Letters Patent is hereby corrected as shown below:

Column 5,
Line 19, delete "creates" and insert therefor -- create --

Column 8,
Line 31, delete "522" and insert therefor -- 552 --

Column 10,
Line 65, delete "555" and insert therefor -- 552 --

Column 11,
Line 39, delete "subroutine 322" and insert therefor -- subroutine A 322 --

Column 16,
Line 15, delete "miltiplexor" and insert therefor -- multiplexor --

Signed and Sealed this

Fourth Day of February, 2003

JAMES E. ROGAN
*Director of the United States Patent and Trademark Office*